April 22, 1952     L. R. BUCKENDALE     2,593,410
SEAL
Filed June 18, 1945
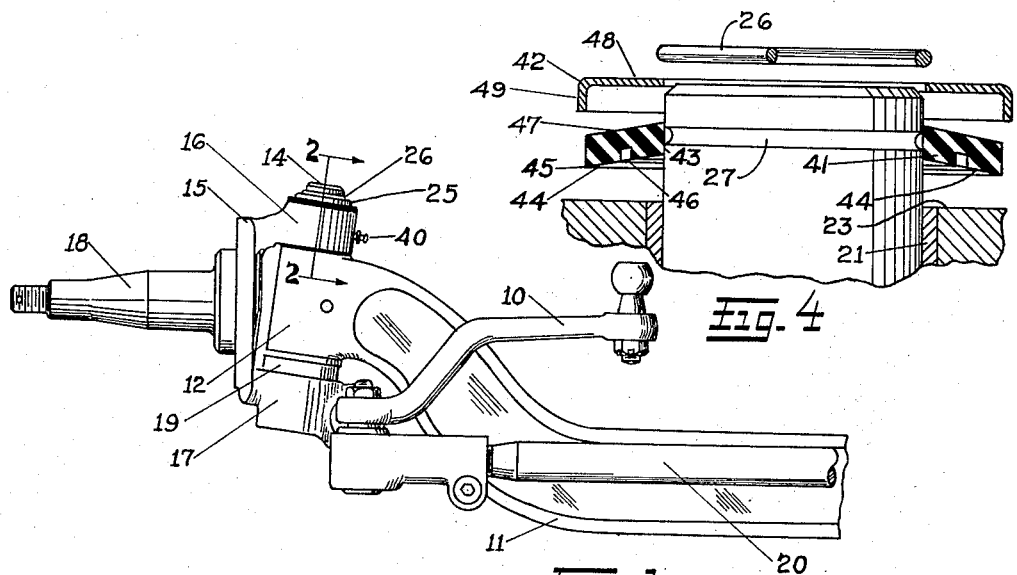
Fig. 4
Fig. 1
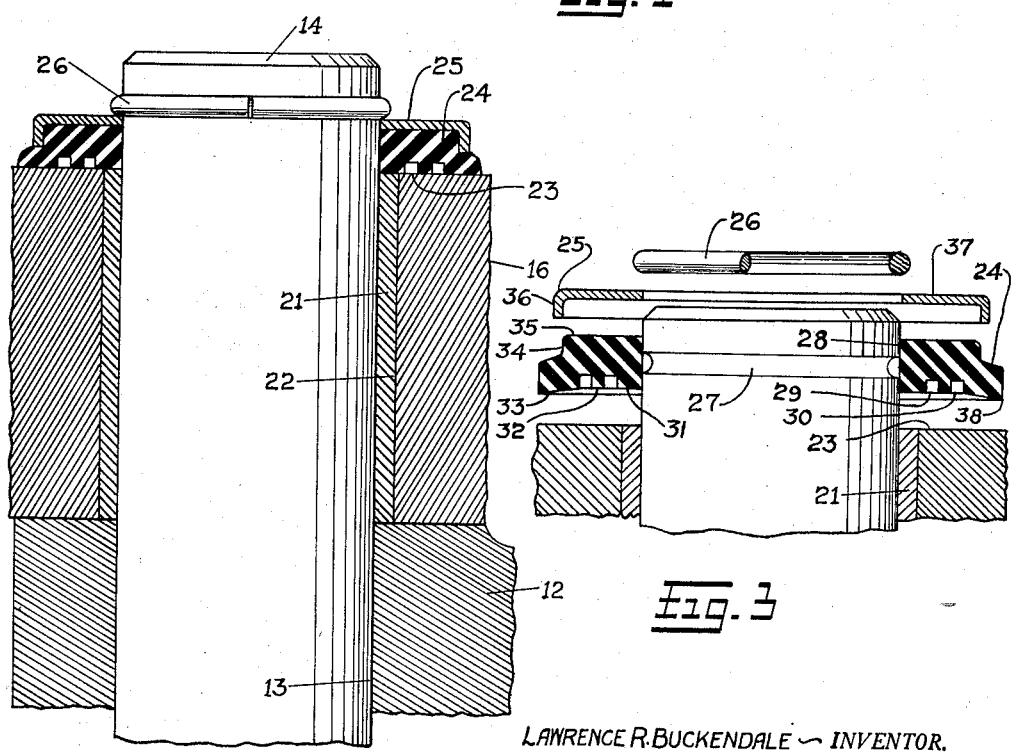
Fig. 3
Fig. 2
LAWRENCE R. BUCKENDALE — INVENTOR.
BY:
Strauch & Hoffman
ATTORNEYS.

Patented Apr. 22, 1952

2,593,410

UNITED STATES PATENT OFFICE 2,593,410

SEAL

Lawrence R. Buckendale, Detroit, Mich., assignor to The Timken-Detroit Axle Company, Detroit, Mich., a corporation of Ohio Application June 18, 1945, Serial No. 600,058

5 Claims. (Cl. 286—11.13)

This invention relates to the provision of a fluid tight seal between relatively rotating coaxial parts, and is especially concerned with a fluid tight seal assembly for preventing the entry of dust, dirt, liquids and like foreign matter into the bearing space between two relatively rotatable coaxial parts such as the king pin of an automotive vehicle steering mechanism and its associated steering knuckle.

Considerable poor performance has been encountered in automotive steering apparatus due to dirt and water entering the space between the king pin and its support bearing on the axle and causing undue wear at this point. Prior to the present invention, common practice in attempting to seal this space was to use an annulus of some flexible packing material such as felt fitted about the king pin and against the adjacent top face of the knuckle housing, together with a suitable clamp for maintaining the felt annulus pressed against the knuckle housing. The difficulty with this type of seal has been that the felt wears rapidly and becomes stiff as it becomes impregnated with oil, water and dirt and soon becomes sufficiently loose or separated from the associated parts to permit dirt and water to enter the space between the king pin and the housing. Attempts have been made to increase the sealing pressure on the felt annulus, but such has resulted only in speedier wearing of the felt without increasing its sealing life perceptibly.

The problem is especially important because these seals are elements of steering apparatus in locations which are not readily accessible and hence not usually checked by careless attendants or mechanics, and their failure is often not discovered until trouble is experienced with steering performance. By that time tires may be ruined and major repairs may be necessary in the steering mechanism. It is therefore desirable that, besides maintaining an efficient closure, the seal have considerable life, preferably for the effective life of the vehicle and at least for the wear life of the king pin and its associated bushing or bearing assembly.

With the above in mind, it is a major object of the present invention to provide a novel fluid tight seal for external assembly with and protecting the bearing space between coaxial relatively rotating parts which is efficient but has considerable life so as to eliminate the need for replacement of the seal during the normal operation or life of the parts.

It is a further object of the invention to provide a novel, externally disposed resilient seal arrangement for preventing the entry of dirt, water and like foreign material between a king pin of an automotive vehicle steering mechanism and the associated steering knuckle.

It is a further object of the invention to provide a novel substantially cup-shaped shallow annular seal member made of homogeneous, oil resistant, tough resilient material which is molded into the predetermined cup-shape when relaxed and which is adapted to be deformed into substantially flat operative condition during assembly in the seal and wherein the inherent resiliency of the seal member held flat in the assembly tends to return it to its cup-shape and effectively provides increased and high sealing pressure adjacent the outer edges of the seal.

It is a further object of the invention to provide a substantially cup-shaped annular shallow seal member of resilient, oil resistant material having on its concave surface one or more concentric annular grooves separating the concave surface of the seal element into a plurality of annular sealing faces adapted to be pressed against a cooperating flat relatively rotatable surface.

It is a further object of the invention to provide a substantially cup-shaped, annular, oil resistant shallow seal element of homogeneous resilient material which has in its relaxed state a sealing face inclining outwardly of the axis at an angle of between 5 and 15 degrees to a perpendicular to said axis.

Figure 1 is a rear elevation of one end of a vehicle steering axle having a seal according to a preferred embodiment of the invention;

Figure 2 is a section along line 2—2 of Figure 1 illustrating the upper king pin seal of Figure 1;

Figure 3 is an exploded view of the seal parts of Figure 2; and

Figure 4 is an exploded view similar to Figure 3 but illustrating a further embodiment of the sealing ring according to the invention.

Referring now to Figure 1, which illustrates a preferred embodiment of the invention, and to Figures 2 and 3 which illustrate in enlarged sections certain details of the seal and its assembly with the king pin and steering knuckle of an automotive vehicle steering mechanism, the usual I-beam type front axle 11 is formed at each end with a hollow, generally vertically extending housing boss 12 formed with an internal bore 13 through which extends a cylindrical king pin 14. King pin 14 is preferably rigidly mounted, as by a press fit, within bore 13. The upper end of king pin 14 projects upwardly outwardly of housing 12. A steering knuckle designated at 15 is mounted for swinging movement on the end of axle 11, being provided with an inner bifurcated end consisting of an upper arm 16 and a lower arm 17. Knuckle 15 carries a horizontally extending stub-shaft 18 upon which the ground engaging wheel of the vehicle is mounted.

The lower end of king pin 14 extends into a suitable thrust and radial bearing assembly 19 carried by lower knuckle arm 17. The upper end of king pin 14 is disposed within a relatively rotatable bearing sleeve or bushing 21 journalled in a suitable cylindrical bore 22 in upper knuckle arm 16 and king pin 14 projects beyond the upper flat face 23 of knuckle arm 16. If desired sleeve 21 may be rigid with pin 14 as in Figure 4. Preferably, the exposed upper end of sleeve 21 and face 23 lie in a common plane which is perpendicular to the axis of king pin 14, said axis being usually inclined at a slight angle to the vertical for the usual purposes of steering performance.

In operation, as in the usual front axle assembly, king pin 14 remains stationary providing a pivot about which steering knuckle 15 swings during steering of the vehicle, and thrust bearing 19 takes substantially the weight of the vehicle at the associated wheel. Bearing sleeve 21, which is not required to take any substantial thrust, is simply a radial bearing between the king pin and the steering knuckle. The usual steering arm 10 connected to the steering controls and the tie rod 20 connected between steering knuckles on the same axle are used.

As will be apparent from Fig. 2, the major problem is to prevent entry of dirt and water and other foreign matter into the space between the king pin 14 and sleeve 21 as well as the space between sleeve 21 and bore 22. In the illustrated embodiment of the invention, this is accomplished by providing a special seal consisting of a generally shallow, cup-shaped, annular resilient element 24 backed and held flat by an annular plate 25 which is preferably a sheet metal stamping or the like and is held in place against the resilient element 24 by a radially expansible and contractible single coil wire spring 26 disposed in a suitable annular groove 27 at the top of the king pin. Groove 27 extends substantially in a plane perpendicular to the axis of pin 14.

Referring now to Figure 3, which illustrates the resilient element 24 of the seal in relaxed condition, that resilient element comprises an integral, homogeneous molded body of an oil resistant, tough, resilient rubber-like material, such as the polymerized vinyl chloride or chloroprene compound known as neoprene. Any suitable resilient materials having the above properties and characteristics, some of which may probably be found in the newer synthetic elastomers, may be employed for making element 24 within the spirit of the invention.

As best illustrated in Figure 3, relaxed element 24 has a central cylindrical bore 28 which fits in fluid tight engagement about the cylindrical surface of pin 14. Element 24 is preferably molded into shape with the diameter of bore 28 slightly smaller than the external diameter of pin 14 and the elastic nature of the material of element 24 permits the element to be stretched when slipped over and mounted on the pin, so that in operation element 24 resiliently grips the entire adjacent peripheral surface of pin 14 in fluid tight engagement therewith. During operation, element 24 therefore normally remains fixed with respect to pin 14.

In the assembly, the concave surface of the cup-shaped element 24 faces downwardly toward the corresponding flat relatively movable surface 23 of the steering knuckle therebeneath. In the embodiment of the invention illustrated in Figures 2 and 3, the concave side of element 24 is formed with a pair of spaced concentric annular grooves 29 and 30 providing a series of downwardly facing substantially flat sealing faces outwardly of the bore. These sealing faces on element 24 are indicated at 31, 32, and 33, and the element is so shaped that the two inner faces 31 and 32 lie in a common plane which is perpendicular to the axis of pin 14, while the outer face 33 is inclined at the angle which gives the element 24 its shallow cup-shape, this angle being preferably in the order of five to fifteen degrees with the planar faces 31 and 32. The width of inner surface 31 is of sufficiently great radial extent that it overlaps the exposed end of bearing sleeve 21 and the space between sleeve 21 and bore 22, thereby effectively protecting that space as efficiently as the space between pin 14 and sleeve 21 as shown in Figure 2 where the parts are in assembled relation.

Element 24 has formed about its upper end an annular cylindrical boss portion 34 of reduced dimension and the upper face 35 of boss 34 is preferably flat and perpendicular to the axis of pin 14, boss 34 and face 35 being adapted to snugly receive the cup-shaped, annular, sheet metal stamping 25 which has a downwardly extending peripheral flange 36 adapted to fit over boss 34 and a flat transverse portion 37 adapted to engage surface 35 of element 24 when the two are assembled as in Figure 2. The relative shapes of boss 34 and stamping 25 are not of great importance in the invention, it being necessary only that the stamping provides a manner of uniformly transmitting the holding pressure of spring 26 to the resilient element 24.

As illustrated in Figure 2, when the parts are in assembled relation element 24 is deformed from its relaxed cup-shape of Figure 3 into a condition where all three surfaces 31, 32 and 33 lie flat in contact with the flat end of sleeve 21 and the planar surface 23 at the top of the knuckle arm 16. This means that the portion of the resilient element 24 in which face 33 is located is during the deformation rocked slightly about a point within the resilient body and, while maintained in its flat condition of Figure 2, that deformed outer annular portion of element 24 tends inherently to regain its original shape relative to the rest of the element and thereby provides increased sealing pressure entirely about the outer edge of the seal. I have assured that sealing faces 31, 32 and 33 all have sharp edges, especially at the outer corner 38 of element 24.

By this arrangement sealing element 24 is held flat with its annular sealing faces pressed against the corresponding flat relatively rotatable surfaces of the knuckle and during operation, as the knuckle swings about pin 14 as a pivot, face 23 rotates slidably relative to the sealing faces on element 24. If desired, a small amount of lubricant may be initially introduced between faces 31, 32 and 33 and the surface 23, thus reducing the friction therebetween and increasing the life of the seal. The sealing faces at 31, 32 and 33 are so efficient that besides tending to prevent the ingress of foreign matter they also tend to provide effective dams for preventing leakage of lubricant outwardly thereof, and even if they should permit some passage of lubricant outwardly such helps to lubricate the seal and more important prevents ingress of water and dirt. A lubricant fitting for bushing 21 is indicated at 40.

During operation, with the parts in assembled relation as illustrated in Figure 2 and with spring 26 holding plate 25 firmly against element 24 with sufficient pressure to maintain that element in flat condition and in good sealing engagement with the steering knuckle, outer sealing face 33 by reason of its sharp edge 38 and its inherent resilient urgency toward surface 23 provides a tight seal against ingress of dirt and water. But any dirt or foreign matter that should penetrate outer edge 38 and travel inwardly between surface 23 and face 33 will be collected in groove 30 and entrapped harmlessly therein, and should any of this foreign material happen to pass beyond through the space between face 32 and surface 23 it will be entrapped in groove 29.

Thus grooves 29 and 30 function effectively as baffles or traps in which any dirt or liquid which might pass through the outer annular sealing faces will be collected and its tendency to progress inwardly of the seal effectively arrested. While I have shown two baffles 29 and 31, it will be appreciated that for some purposes the object of the invention may be accomplished by using only one baffle, or in some instances it may be that more than two baffles may be required without departing from the spirit of the invention.

Besides the inherent resiliency of the outer portion of element 24 tending to increase the sealing pressure at the outer edge of the seal, it will be seen that this inherent tendency of the deformed element to return to its original condition will also tend to preserve high sealing pressure at the outer seal edge even through a range of considerable wear of edge 38 or face 31. This effectively increases the useful life of the seal, and during its operational life the seal of the invention maintains a substantially constant sealing pressure and has self-compensatory action for wear.

During operation, the engagement of the stamping plate 25 with surface 35 of resilient element 24 effectively prevents twisting of the annular element 24 during turning of the steering knuckle and at the same time comprises an effective medium for transmission of the holding force between the spring 26 and element 24, as it will be seen without a rigid full backing such as plate 25 the holding pressure exerted by spring 26 would not be uniformly distributed and resilient element 24 might buckle.

In practice, the relative dimensions of the sealing faces of element 24 are a matter of adaptation to particular purposes of use mainly, although I prefer that grooves 29 and 30 be located approximately midway between the inner and outer peripheries of the element with sealing surface 32 disposed therebetween and being of about the same width as each groove or about $\frac{1}{16}$ to $\frac{3}{32}$ of an inch. Inner sealing face 31 must bridge sleeve 21 and the outer or primary sealing face 33 is preferably much wider than either of the other faces.

The inclination of face 33 relative to a plane perpendicular to the axis of pin 14 may be anywhere between five and fifteen degrees as above explained, the particular angle selected being dependent on many factors such as the diameter of the element 24, the larger the diameter of element 24, the larger the angle of inclination of face 33, the resiliency of the material of element 24, and the general nature and purpose of the seal.

A further embodiment of the invention is illustrated in Figure 4 wherein corresponding parts of Figures 1 through 3 are given corresponding reference numerals. The difference between Figures 3 and 4 is chiefly that the annular resilient element 41 of Figure 4 is of different construction than element 24 and is held in place by a cup-shaped stamping 42 of slightly different configuration than stamping 25. Resilient element 41 comprises a cup-shaped annular molded body of the same material as element 24. It is relatively thin and cup-shaped in its relaxed condition as illustrated in Figure 4, and its internal bore 43 is adapted and shaped for tightly gripping the outer periphery of pin 14 similarly to element 24. Element 41 however has on its concave side a generally conical face 44 which inclines outwardly and downwardly continuously from bore 43 to an outer sharp edge 45. About half way between bore 43 and edge an annular surface groove 46 is provided in face 44, and this groove has opposite sharp edges where it joins with face 44. The upper or convex side of the element 41 is formed as a substantially conical surface 47 parallel to face 44. Stamping 42 comprises a flat sheet metal plate annulus 48 having a downturned right angle flange 49 adapted to fit over the outer peripheral side of element 41 when the two are pressed together in sealing assembly.

While the parts are illustrated in the exploded view of Figure 4 to show the cup-shaped nature of the resilient annulus 41 when in relaxed condition, it will be appreciated that in the actual operative sealing assembly annulus 41 is deformed flat against the upper steering knuckle surface 23 so that face 44 on both sides of groove 46 is in full surface rubbing contact with surface 23. Element 41 is held in its flat deformed condition by stamping 42, surface 47 lying substantially in a plane in full surface engagement with the bottom of plate 48 when the parts are assembled in the seal and the two being held in sealing relation against face 23 by reaction of spring 26, as in the first described embodiment. Surfaces 44 and 47 lie in planes parallel to each other and perpendicular to the axis of pin 14 in the assembly.

In practice, an angle of ten degrees to the perpendicular to the axis of pin 14 has been found extremely satisfactory for face 44, although the particular angle may be selected anywhere throughout the range of five to fifteen degrees in this embodiment of the invention according to the particular problem at hand, the amount of cup of the resilient element in both embodiments of the invention determining the final tightness of the seal.

In operation in the assembly the inherent tendency of the flat deformed element 41 to regain its molded cup shape provides a good wear compensating seal especially at outer sharp edge 45, and groove 46 functions to trap any dirt or liquid that may escape past edges 45.

By using polymerized vinyl chloride or neoprene as the material from which the resilient annulus of the invention is made, I provide as a seal material which must maintain rubbing contact with a relatively rotating part, one which has extremely low coefficient of friction and yet is of sufficient toughness to withstand considerable wear and is further of sufficient shear strength to resiliently take the torque of the relatively rotating parts without losing contact. The seal of my invention has many times the life of felt or like seals previously used prior thereto and if properly designed and installed should last at least the life of the associated steering mechanism, so that no replacement may be necessary during the life of the vehicle and this source of trouble in the steering mechanism eliminated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a sealing assembly wherein an inner cylindrical pin projects through a surrounding relatively rotatable part having a flat outer sealing surface surrounding and disposed substantially at right angles to the axis of said pin, an element of resilient homogeneous material having a bore tightly gripping the periphery of said pin and having a sealing face adapted to engage said flat surface of said part, said resilient annulus being cup-shaped in relaxed condition with said sealing surface substantially concave, a backing member for said element, means to position said member in axially fixed relation on said pin to deform said element and press said sealing face flat against said surface in the assembly, and an annular groove formed in said sealing face of said sealing element for trapping foreign matter which may enter the seal and pass along said surface, the outer edge of said sealing face being more tightly pressed against said surface than the inner portion thereof for optimum resistance to entrance of foreign matter into the assembly.

2. In a sealing assembly wherein an inner cylindrical pin projects through a relatively rotatable part having a flat sealing surface surrounding and disposed substantially at right angles to the axis of said pin, a resilient annulus of homogeneous material having its inner periphery in fluid tight engagement with the periphery of said pin and having a bottom sealing face adapted to engage said surface, said annulus being of generally cup-shape with a substantially concave sealing face when relaxed, an annular groove in said sealing face, and means for deforming and holding said resilient annulus substantially flat in operative assembly with said part with said sealing face in sliding engagement with said surface comprising a flat relatively rigid wide backing member engaging said annulus opposite said sealing face, and means engaging said pin and said backing member for holding said backing member tightly against said annulus for maintaining said annulus deformed into substantially flat condition with said sealing face pressed against said surface, the outer sealing face portion of said annulus bearing more tightly against said surface than the inner portion thereof whereby optimum resistance to the entry of foreign matter into the assembly is provided.

3. In the assembly defined in claim 2, said holding means comprising an annular groove in said pin adjacent said backing member, and a snap ring in said groove engaging said backing member.

4. In a sealing assembly, a cylindrical pin, a member rotatable about said pin and having an outer flat surface surrounding said pin, a bushing between said pin and said member, a resilient annulus of homogeneous material having its interior fluid tight with said pin and a smooth annular sealing face adapted to contact said surface, said annulus in its relaxed condition being cup-shaped with said sealing surface substantially concave, an annular groove in said annulus radially inwardly of said sealing face, a second smooth annular sealing face on said annulus inwardly of said groove and of sufficient width to bridge the adjacent end of said bushing and a member substantially fully backing said annulus urging said annulus into deformed condition with said sealing surface in flat, tight relatively slidable engagement with said surface.

5. In a sealing assembly wherein a pin projects upwardly through a relatively rotatable part having a substantially flat upwardly facing surface surrounding said pin; an annular element of resilient homogeneous material having its inner periphery gripping said pin with a fluid tight friction fit and having a downwardly facing sealing surface formed with a continuous sharp edge about its outer periphery, said downwardly facing sealing surface being substantially concave when said element is in relaxed condition, an annular groove in said sealing surface spaced from said pin, an upper backing member for said element, and means received in a recess in said pin holding said backing member in rigid engagement with said element whereby said sealing surface is deformed into flat engagement with said upwardly facing surface in the assembly.

LAWRENCE R. BUCKENDALE.

REFERENCES CITED

The following references are of record in the file of this patent:

UNITED STATES PATENTS

| Number | Name | Date |
|---|---|---|
| 817,898 | Benjamin | Apr. 17, 1906 |
| 1,344,028 | Ewald | June 22, 1920 |
| 1,422,972 | Henry | July 18, 1922 |
| 1,624,671 | Nelson | Apr. 12, 1927 |
| 1,667,337 | Weston | Apr. 24, 1928 |
| 1,705,630 | Woolson | Mar. 19, 1929 |
| 2,341,900 | Boden | Feb. 15, 1944 |
| 2,373,443 | Armington | Apr. 10, 1945 |

FOREIGN PATENTS

| Number | Country | Date |
|---|---|---|
| 263,398 | Germany | of 1913 |